United States Patent
Foster

(10) Patent No.: US 10,417,745 B2
(45) Date of Patent: Sep. 17, 2019

(54) CONTINUOUS MOTION SCENE BASED NON-UNIFORMITY CORRECTION

(71) Applicant: Raytheon Company, Waltham, MA (US)

(72) Inventor: Rodney A. Foster, Garland, TX (US)

(73) Assignee: Raytheon Company, Waltham, MA (US)

( * ) Notice: Subject to any disclaimer, the term of this patent is extended or adjusted under 35 U.S.C. 154(b) by 500 days.

(21) Appl. No.: 15/195,232

(22) Filed: Jun. 28, 2016

(65) Prior Publication Data
US 2017/0372453 A1 Dec. 28, 2017

(51) Int. Cl.
G06T 5/00 (2006.01)
G06T 7/246 (2017.01)
H04N 5/365 (2011.01)

(52) U.S. Cl.
CPC .............. G06T 5/002 (2013.01); G06T 7/246 (2017.01); H04N 5/3656 (2013.01)

(58) Field of Classification Search
CPC ........ G06T 7/246; G06T 5/002; H04N 5/3656
See application file for complete search history.

(56) References Cited

U.S. PATENT DOCUMENTS 5,514,865 A * 5/1996 O'Neil ................... H04N 1/401
250/208.1
5,838,813 A 11/1998 Kancler et al.
7,995,859 B2 8/2011 Hogasten
8,503,821 B2 8/2013 Hogasten
2006/0126952 A1* 6/2006 Suzuki ................ G06T 5/002
382/233
2008/0298704 A1* 12/2008 Nachlieli .............. G06T 5/003
382/254
2010/0201883 A1* 8/2010 Delva ..................... G06T 5/50
348/607
2010/0329583 A1 12/2010 Whiteside et al.
2013/0156158 A1* 6/2013 Noji ......................... A61B 5/08
378/62
2014/0016879 A1* 1/2014 Hogasten ................ H04N 5/33
382/264
2014/0037225 A1* 2/2014 Hogasten ................. G06T 5/50
382/260
2015/0312489 A1* 10/2015 Hoelter .................... H04N 5/33
348/164

(Continued)

OTHER PUBLICATIONS

International Search Report and Written Opinion from related PCT Application No. PCT/US2017/018077 dated Jul. 31, 2017.

Primary Examiner — Vincent Rudolph
Assistant Examiner — Pinalben Patel
(74) Attorney, Agent, or Firm — Burns & Levinson, LLP; Joseph M. Maraia

(57) ABSTRACT

Methods and apparatus are disclosed for reducing an amount of fixed pattern noise from sequential frames captured by IR imaging sensor(s) that contain known continuous motion component(s). Improved scene based non-uniformity correction techniques are employed for recursively updated set of pixel correction terms for each frame, in order to generate corrected frames. The set of pixel correction terms may be recursively updated through a multi-step process making use of the known continuous motion component, which may comprise a dithered signal.

31 Claims, 10 Drawing Sheets

(56) References Cited

U.S. PATENT DOCUMENTS

| | | | | |
|---|---|---|---|---|
| 2015/0332454 A1* | 11/2015 | Yin | ....................... | G06T 7/0012 |
| | | | | 382/131 |
| 2015/0334315 A1* | 11/2015 | Teich | ................... | H04N 5/2257 |
| | | | | 348/164 |
| 2015/0358560 A1* | 12/2015 | Boulanger | ............. | H04N 5/332 |
| | | | | 348/164 |

* cited by examiner

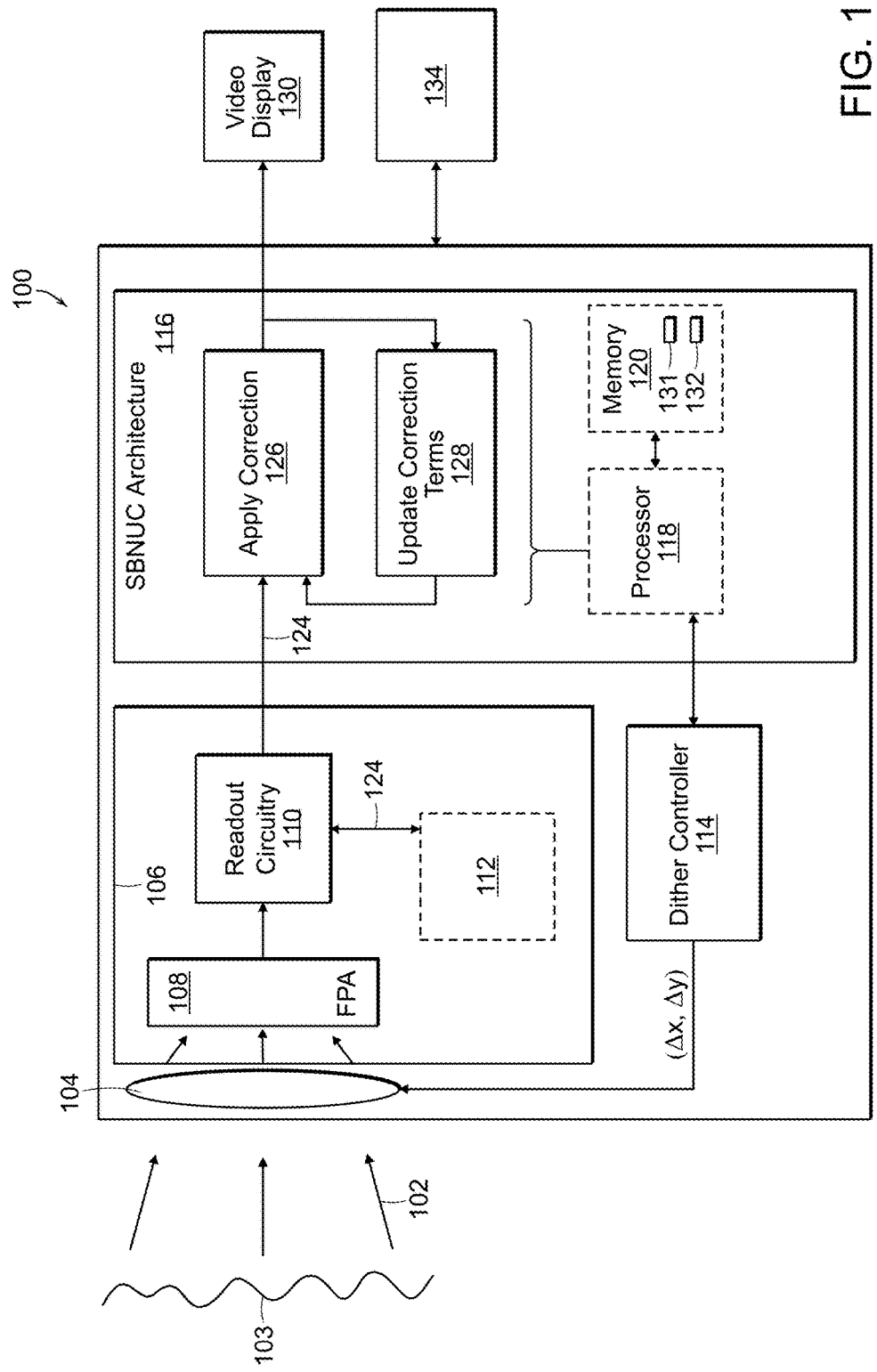

Raw Lab Video

Known Dither SBNUC Corrected Lab Video

CONTINUOUS MOTION SCENE BASED NON-UNIFORMITY CORRECTION

U.S. GOVERNMENT INTEREST

There is no U.S. Government ownership or other interest in the invention(s) described and claimed herein.

BACKGROUND

The present invention relates to non-uniformity correction of imagery collected by detector arrays. More particularly, the present invention relates to scene-base non-uniformity correction (SBNUC) of imagery collected by infrared (IR) focal plane array (FPA) imaging systems.

IR imaging systems are used in a variety of demanding applications, including night vision systems to target detection systems. Such applications often require very detailed and accurate information. FPA sensors may include thousands of IR photon detectors, with different sensitivities to thermal energy and conditions. The performance of many IR imaging systems is limited by fixed pattern noise (FPN), or spatial nonuniformity in photodetector response, that is a manifestation of differences in pixel intensity, even when imaging the same amount of impinging radiation from a scene. The primary source of this FPN is attributed to the fact that each photodetector in the FPA has a differing photoresponse, due to detector-to-detector variability in the FPA fabrication process. One-time factory calibrations are mostly ineffective, because the response of each FPA photodetector changes uniquely over time, causing the FPN to slowly and randomly drift throughout sensor operation. Some sensors include larger blobs that drift together, causing even small offsets to be visible in the imagery.

Standard calibration processes remove the noise at the time of calibration, but image quality is gradually degraded between each calibration. Some sensors require frequent calibration in order to maintain an acceptable image quality. Staring IR sensors take a significant period of time to calibrate, during which time the sensor is unavailable for imaging. Though the true response of each FPA detector is nonlinear, the response is typically modelled linearly, having both a gain and bias component. Thus, under this linear assumption, the gain and bias are different for each photodetector and give rise to the nonuniformity. Techniques that seek to estimate these gain and bias (or level) parameters, and subsequently employ the estimates to remove the non-uniformity by generating correction coefficients for each detector element in the array, are known as nonuniformity correction (NUC) techniques. Source-based NUC and SBNUC techniques are the two primary classes of NUC techniques. SBNUC techniques use captured imagery of the observed scene to determine and continually update correction coefficients as required by changing conditions, in order to reduce or eliminate FPN present in the detection system.

However, such methods typically require line-of-sight (LOS) motion to distinguish real scene content from FPN. SBNUC methods do not work well when there is no scene motion, or when only part of the scene is moving relative to the sensor, as scene details may be confused with FPN resulting in image degradation. This has previously limited the applicability of SBNUC techniques to applications where the scene is always moving relative to the sensor, such as in aircraft and missile application. Previous SBNUC techniques typically employ a high pass filter to permit correction of only high frequency FPN, in an effort to minimize the impact of real scene content. High frequency scene content areas are typically identified and further processing in those areas is avoided in a given frame. These methods converge slowly to minimize the effect of temporal noise and scene content impacting FPN correcting terms. Rapid changes in input scene intensity thus result in correspondingly rapid changes in FPN, which are not fully corrected. An additional problem with these approaches is that outlying pixels may be difficult to distinguish from high frequency content and, as a result, residual FPN artifacts can be present in an image. These artifacts may look like random "spots", "lines" and/or other visible artifacts to the end-user Thus, what is needed is a continuous, reliable FPN correction method and system that does not degrade scene details when the scene is stationary, and which preserves the true image spatial context while removing noise.

BRIEF SUMMARY

The foregoing and other problems are overcome by methods and apparatus in accordance with embodiments of this disclosure, wherein an imaging system includes a means for continuously dithering the LOS of an IR-FPA sensor (e.g., a thermal wave, short wave or near IR sensor, etc.), for example, and SBNUC image processing (and processor) that significantly improves the performance of the imaging system. This enables better separation of scene content from FPN in the imagery. Continuously dithering the LOS allows the system to maintain image quality under a much wider range of conditions, including the most important operational modes. Once the FPN is removed, the dither is removed from the image using image processing functions to align frames of the imagery. Since the dither is intentionally introduced, it is possible to know the dither from frame to frame, and using that information allows further enhancement to the process to separate FPN from the scene content.

In some embodiments, an optical or mechanical means, such as an Image Motion Compensation (IMC) mirror, may be used to introduce continuous dither in the image, which may later be removed electronically. Knowledge of the dither sequence introduced may be employed in making a direct measure of the FPN in an image with greatly suppressed scene content. The spatial signal present in the scene may be separated from the FPN (spatial signal artifacts) generated in the IR-FPA. In one embodiment, two measures of the FPN, redundancy tests, and decay compensation are employed to reduce leakage of scene content and minimize errors. In another embodiment, a modulated motion scale factor may be used to reduce the impact of an incorrect scale factor.

In another embodiment, a computer-implemented method is disclosed for reducing an amount of FPN from infrared images. One or more processors may receive a plurality of sequential frames captured by an imaging sensor that contain a known continuous motion component. The processor(s) may apply, for each frame in the plurality, a recursively updated set of pixel correction terms in order to generate a corrected current frame. The set of pixel correction terms may be recursively updated through a multi-step process starting with aligning the corrected current frame with a corrected preceding frame, wherein the preceding and current frames comprise sequential frames having different scene LOS due to the known continuous motion. A current error frame may be then calculated from at least one difference frame between the corrected current and preceding frames after alignment. As a validation check, the current error frame may be correlated with a current error frame of the preceding iteration to in order to determine a set of consistent pixel errors. A contrast measure that identifies image areas of potentially image corrupting contrast may be generated in any of multiple manners, such as by measuring contrast edges in a raw difference image between the corrected current and preceding frames, in one or more of the aligned difference images, and/or in the raw uncorrected current frame. The consistent pixel errors that are to be applied to the correction terms set may be adjusted based on the contrast measure, thereby obtaining an adjusted consistent error. The updated set of current correction terms are then generated by adding the adjusted set of consistent pixel errors to the preceding set of correction terms (e.g., by applying a gain to the set of consistent pixel errors limited by the contrast measure.) The known continuous motion component may then be removed from the corrected current frame. The process results in a series of FPN-reduced images that may comprise a video stream.

In one embodiment, as noted above, the known continuous motion component may comprise an optically induced continuous dither pattern in the LOS of the imaging sensor. The optically induced continuous dither pattern may include a pattern scale factor capable of being modulated, in order to mitigate scene edge errors by alternating between successive frames the polarity of the scene edge errors. The dither may be induced with image motion compensation optics, and removal of the dither may be achieved by alignment of at least one of rows, columns and rotation of pixels in an FPA of the imaging sensor. In another embodiment, the continuous motion component may be determined by measuring LOS motion data.

In another embodiment, aligning the corrected current and preceding frames may be achieved by resampling the preceding frame in alignment with the current frame based on the known continuous motion component, and registering the corrected current and preceding frames.

In yet another embodiment, the updated set of current correction terms may be generated by applying a continuous decay function to the sum of the set of adjusted consistent pixel errors and the preceding set of correction terms, in order to avoid inducing time domain noise. A decay compensation process may be applied to the sum of the set of adjusted consistent pixel errors and the preceding set of correction terms in order to mitigate the offset introduced by the decay function. The size of the decay applied may be determined based on a maximum value of the set of consistent pixel errors over the preceding two frames.

In one embodiment, the current error frames of the instant and preceding iteration may be correlated, in part, by setting the set of consistent pixel errors to equal the smaller of the values of the instant and preceding iteration's current error frames, and if the respective polarities of the current errors associated with the corrected preceding frame and the set of consistent pixel errors of the instant frame are different, setting the set of consistent pixel errors to zero.

The current error frame may be calculated in numerous non-limiting techniques. For example, two difference frames obtained by subtracting the aligned corrected current or preceding frame from the other frame may be averaged to determine the current error frame. Alternatively, the aligned corrected previous frame may be subtracted from the corrected current frame. Further, the current error frame may be calculated by setting, on alternating iterations, the current error frame to the difference frame resulting from subtracting (a) the aligned corrected current frame from the corrected previous frame and (b) the aligned corrected previous frame, from the corrected current frame.

In other embodiments, computer-readable medium storing executable instructions are disclosed that, when executed by one or more image processing processors, cause the one or more processors to perform any of the methods and techniques described above.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE FIGURES

The illustrations of the accompanying drawings are not necessarily to scale, emphasis instead being placed upon illustrating the principles of the examples.

FIG. 1 is a block diagram illustrating an imaging system in accordance with an exemplary embodiment;

DETAILED DESCRIPTION

Figure 2A:
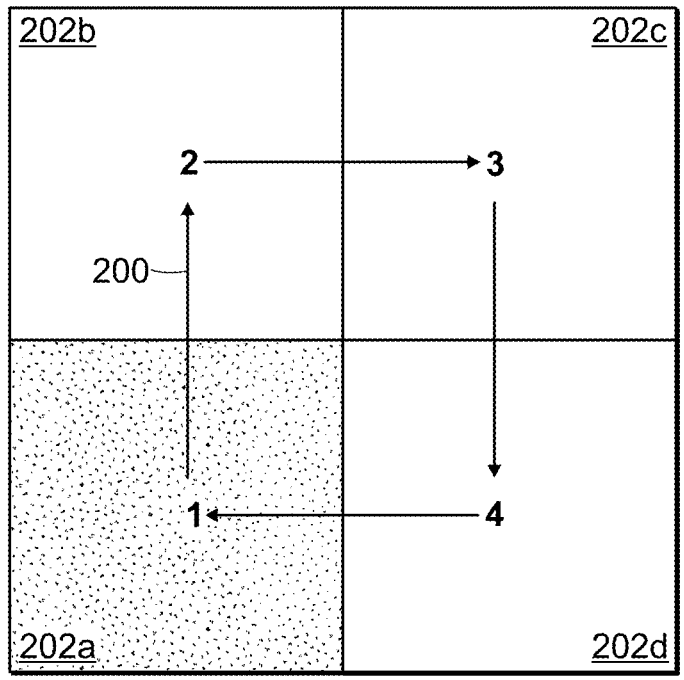
FIGS. 2A and 2B are illustration of a simple array exhibiting a dithering pattern.

Reference is now made to FIG. 1 for illustrating an IR radiation imaging system 100 configured to reduce FPN through continuous dithering SBNUC processing. Electromagnetic radiation, such as IR radiation 102 from an instantaneous field of view of a scene 103, enters the system 100 through an entrance aperture and is collected and focused with a suitable dithering optical element 104, such as a lens or IMC. The scene image is focused onto a radiation receiving surface of an IR-FPA 108, such as commonly known in the field. The optical element 104 may be coupled to suitable x-axis and y-axis actuators (not shown), repositioning optical element 104 along two axes as directed by dither controller 114. As such, the pointing direction of the lens can be controlled relative to the radiation receiving surface of the IR-FPA 108. The movement of the optical element 104 corresponds to a movement of the IR scene radiation by an amount proportional to a dimension of a single pixel, or a fraction of a pixel dimension, upon the radiation receiving surface of the IR-FPA 108. The optical element 104 thus controllably positions the IR scene radiation 102 on the IR-FPA 108 for integration and readout multiplexing.

Figure 2B:
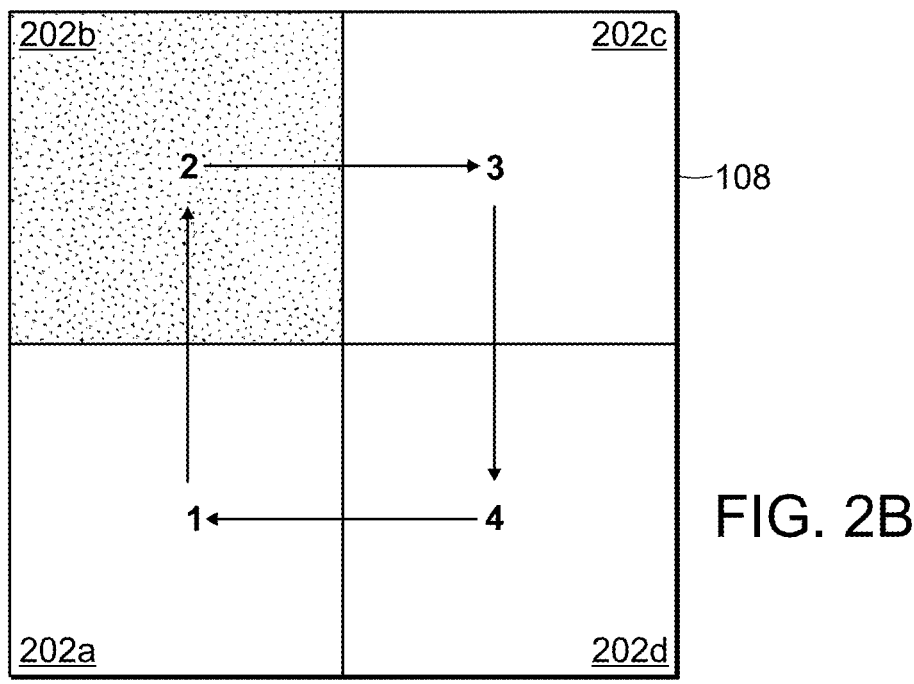

Dither controller 114 outputs one or more positioning signals, such as signals Δx and Δy, to the optical element 104 and to a SBNUC architecture 116 (alternatively, dither controller may receive these signals from SBNUC architecture 116 and relay them to optical element 104.) The dither controller 114 is configured to dither the optical element 104 by in a pattern known to and synchronized with the operation of the SB-NUC architecture 116, repositioning the IR scene radiation along the surface of IR-FPA 108 by distances relative to a frame of pixels comprising the IR-FPA 108. For example, with reference to FIGS. 2A and 2B, the scene image may be shifted along a known pattern 200 (e.g., 1→2→3→4) across one or more detectors 202a through 202d forming the FPA on sequential image frames. In the example shown, the scene image is shifted one full pixel-to-pixel length (e.g., from 202a to 202b, etc.) and in only one direction with each iteration, however many known patterns may be employed, including partial and two-dimensional motions. Selection of the dither pattern depends on the performance objectives of the system. A large dither pattern comprised of many pixels may mitigate non-responsive or dead pixels in the FPA, while a small dither pattern may reduce computational complexity and power requirements for the dithering mechanisms.

A portion of light from the scene 103 falls upon each individual detector element 202a-202d of the FPA 108. Each individual detector 202a-202d of the FPA 108, and its associated read out electronics module 110 convert impinging photons into an image signal representing a snapshot of the observed image found in the scene 103 at a particular instant, and outputs the instantaneous group of signals from all of the detectors as an image frame of a video stream 124.

An example of an optical element 104 capable of introducing the desired dithering is an image motion compensation (IMC) mirror mounted on a motorized gimbal, and a fast steering mirror. Either may be used to change the LOS of the scene image relative to the FPA.

In an embodiment (not shown) that would be readily appreciated by those of skill in the field, rather than scanning the image across the surface of FPA 108, the dither controller 114 and FPA 108 may alternatively be configured to scan the FPA 108 relative to the scene image. Either form of dithering control may be used to introduce a known, repeatable pattern of continuous motion of the scene image relative to the detectors of the FPA 108. With that continuous motion pattern known, an algorithm may then be employed in the SBNUC architecture 116 to separate the scene content from the FPN.

With reference again to FIG. 1, sequential frames of video data stream 124 may be stored in memory 112 and output to SBNUC architecture 116 by read out module 110 for identification and removal of FPN. Read out module may include an analog-to-digital converter for converting analog scene imagery data detected by the detectors into digital imagery data. SBNUC architecture 116 may be comprised of a SBNUC processor 118 (e.g., a microprocessor, an application specific integrated circuit, or a field programmable gate array FPGA device), a memory 120 for storing initial (factory-calibrated) values of a set of correction terms 131 and updated correction terms 132, and software code. The set of SBNUC correction terms 131, comprising values of gain and level coefficients for the respective FPA detectors 202, may be retrieved from memory 120 and applied (shown in functional block 126) to each frame of the video stream 124 to adjust each pixel therein to compensate for FPN. The correction terms 132 may be dynamically updated (as shown in functional block 128) with each new video frame processed by SBNUC processor 118. Processor 118 controls the gathering and processing of successive frames of scene image data from input video stream 124. System 100 may also be configured with a video display device 130 an input device 134 for adjusting parameters controlling the operation of the dithering mechanism and/or the SBNUC process.

Figure 3:
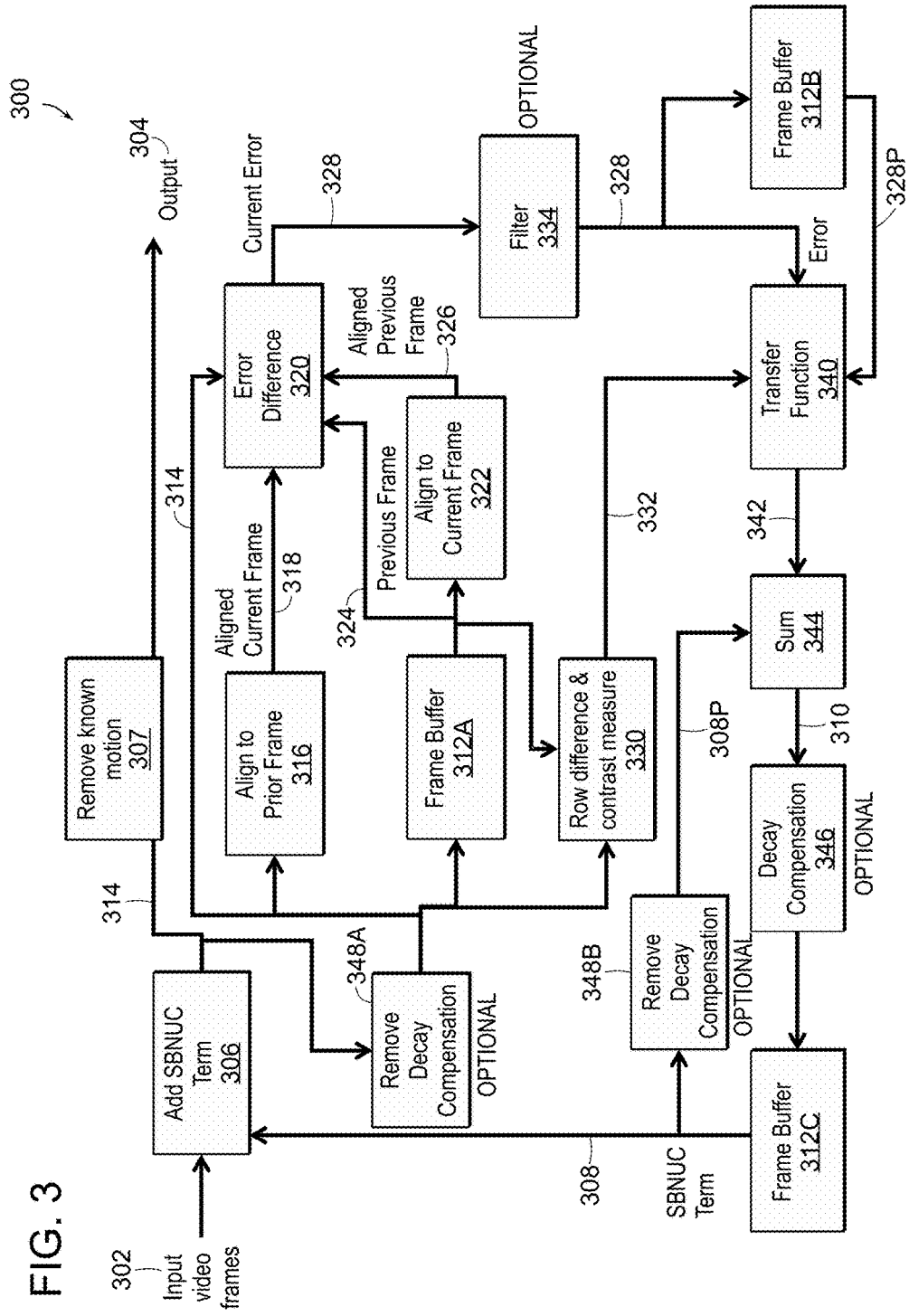
FIG. 3 is a flow diagram illustrating a method in accordance with an exemplary embodiment.

FIG. 3 illustrates a high level functional flow diagram of the operation of the image processing performed by the continuous motion SBNUC architecture 116 to remove FPN from received input video stream 302 in order to generate a FPN-corrected video stream 304 as output. The flow diagram may be views as a method 300, with the functional blocks (e.g., error difference block 320) indicating steps performed for recursively applying (306) the set of SBNUC correction terms 308 (i.e., gains and offsets) to the pixels of successive frames of the input video stream 302, and for recursively generating updated correction terms 310. Method 300 may be embodied in a software algorithm stored on a computer or machine-readable storage memory 120 (such as flash memory, EEPROM, or other non-volatile electronic memory) having computer or machine readable instructions that are executed by processor 118.

To reduce the occurrence of FPN in the output video stream 304, method 300 uses two sequential frames (current corrected frame 314 and previous corrected frame 324), in several combinations, to generate a difference frame (current error frame 328) that minimizes scene content, leaving FPN in the image. The LOS from the FPA to the scene (and, thus, perception by the FPA of the scene) for any current frame 314 and previous frame 324 will be different due to the known continuous motion (introduced or measured) occurring between the respective frame captures. Each of the detectors produces an image signal having a scene content component and a FPN component. The scene content spatially varies in a manner that causes each detector to output a temporally varying signal corresponding to the scene content while the FPN component of each detector does not spatially vary during the dithering pattern, thereby causing the detectors to output a relatively constant temporal signal corresponding to the FPN. Advantageously, continuous motion allows the system to maintain image quality even when there is no motion in the un-dithered scene content, allowing use in a much wider range of conditions, including the most important operational modes. Frame buffers 312A through 312C are configured to store multiple image frames for use by processor 118 for use as needed in the image processing method 300.

One embodiment of a sub-process of method 300 for recursively generating the sets of updated pixel correction terms 310 will now be described with continued reference to FIG. 3 and additional reference to FIGS. 4A-4C. The current error frame 328 may be generated in several manners. In a first embodiment, current error 328 (a difference frame) is generated by first subtracting (at block 320) by aligning (at 322) the corrected previous frame 324, retrieved from frame buffer 312A, to be in alignment with corrected current frame 314, to obtain an aligned corrected previous frame 326. For example, if corrected previous frame (e.g., "A") had been moved 2 pixel lengths from its nominal (unshifted) position to the right by the dithering pattern, while current corrected frame (e.g., "B") had been moved 2 pixel lengths from nominal to the left, then to align frame A to B, frame A would be resampled 4 pixel lengths to the left. Then, each of the individual pixel values of aligned corrected previous frame 326 are subtracted from the corresponding values in corrected current frame 314, in order to obtain current error 328. This option may increase the impact of motion in the scene content; i.e., an object moving in the scene will cause a consistently positive error in areas where a higher intensity is moving over an area of lower intensity. This may result in a large low frequency offset in the correction terms that dissipates very slowly (i.e., area is larger than the dither pattern, so it is removed very slowly.)

In an another embodiment, current error 328 is generated by retrieving corrected previous frame 324 from buffer 312A and subtracting (at 320) from it an aligned corrected current frame 318 obtained in a similar fashion by aligning it to the known dithered position of the corrected previous frame 324. In the context of the example described above, frame B would be resampled four pixel lengths to the right.

Figure 4A:
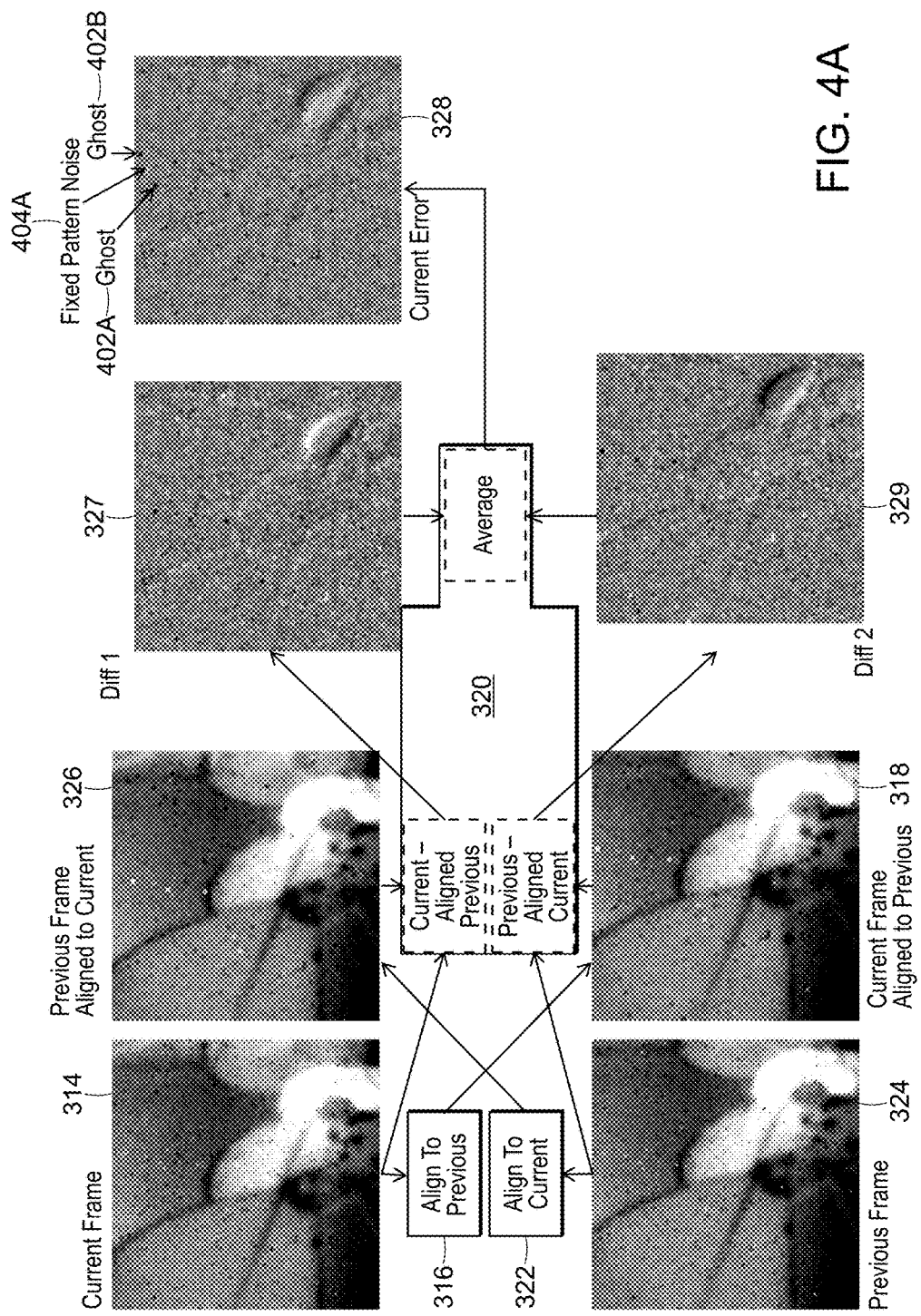
FIGS. 4A through 4C are flow diagrams with associate image frames of an exemplary differencing process.
Figure 4B:
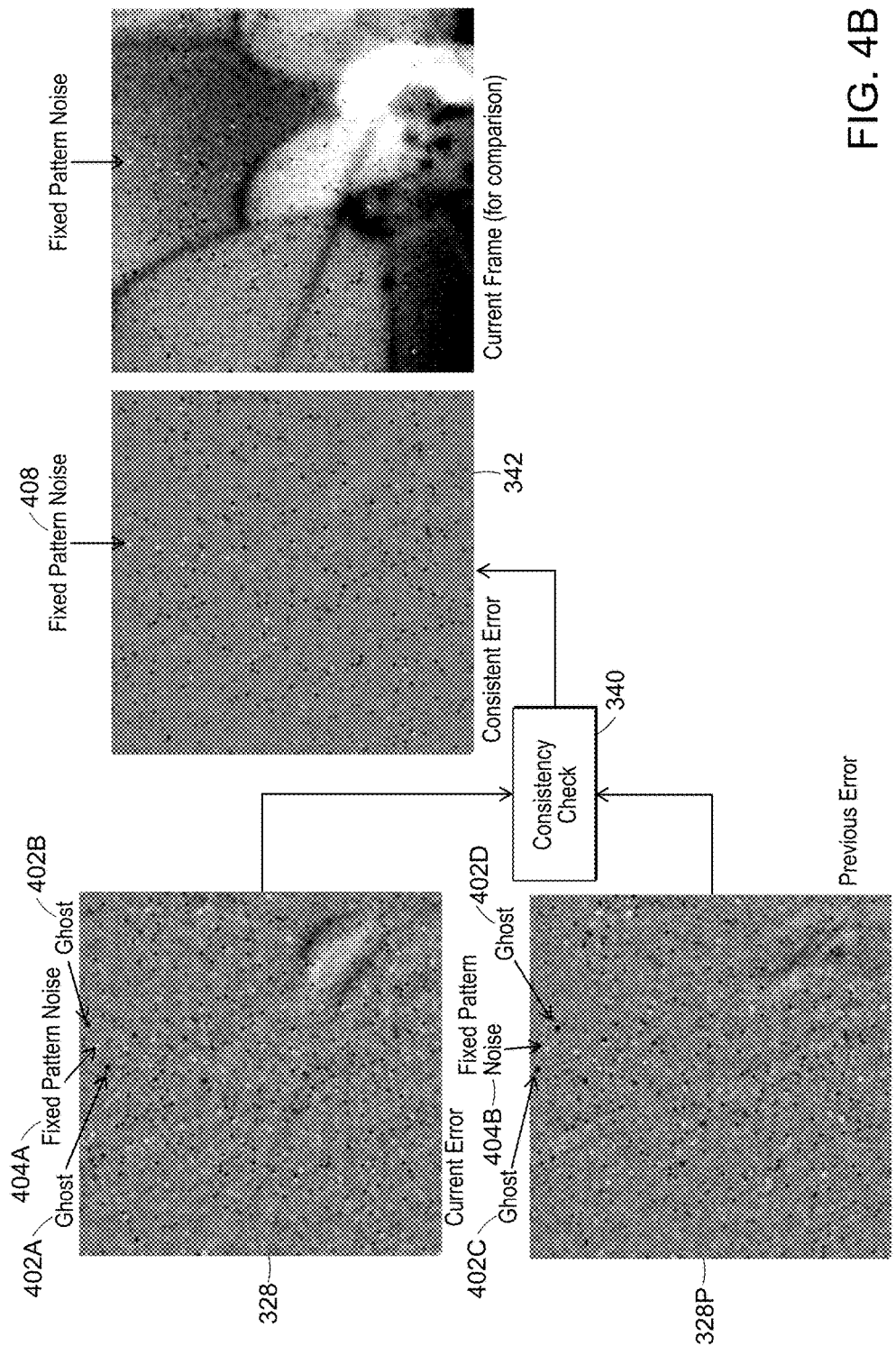
Figure 4C:
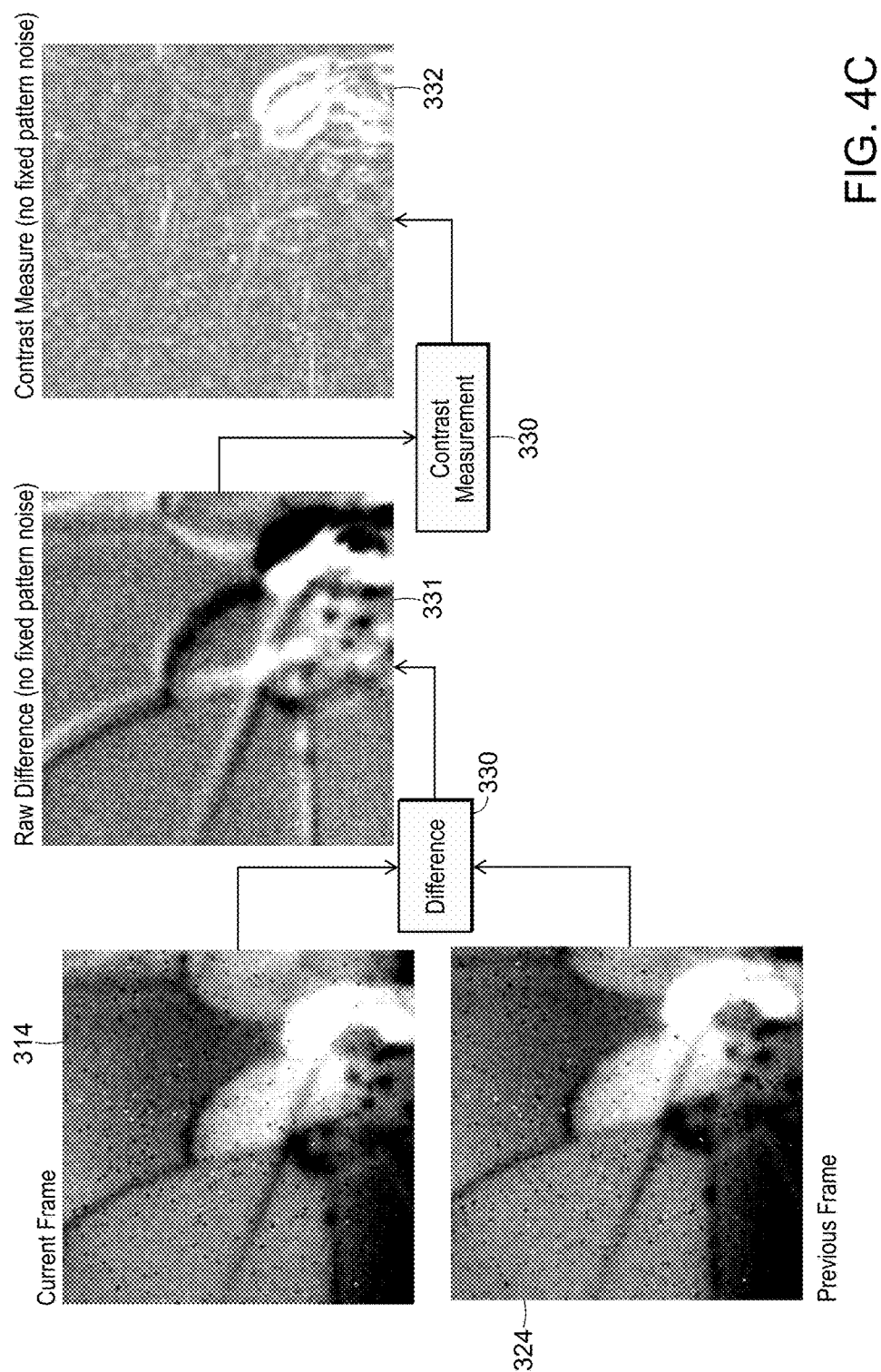

In another embodiment, illustrated with actual images in FIG. 4A, first difference image 327 is formed as described above by subtracting the aligned previous frame 326 from the corrected current frame 314 and a second difference image 329 is formed by subtracting the aligned current frame 318 from corrected previous frame 324. Current error 328 could then be generated by, on subsequent correction term updating iterations, setting current error 328 alternately to the values of difference image 327 and difference image 329. This reduces firmware throughput requirements by only needing one image alignment per frame instead of two. In another embodiment, illustrated in FIG. 4A, the difference images are averaged on each iteration to generate current error 328. In theory, if the scene and LOS are not moving, then the current error 328 would have only FPN. In practice, several other image processing steps are useful.

Method 300 may include an optional filtering step 334. If no high pass filter is employed, large FPN objects will have real and negated versions overlap and cancel in places, making the size of the dither pattern the limit on the size of FPN objects that can be quickly removed. A high pass filter can be generated using a low pass filter to estimate the local mean, and subtract it from the current error 328. The size of the low pass filter can be adjusted to optimize the size of the FPN objects that can be quickly removed.

Figure 5A:
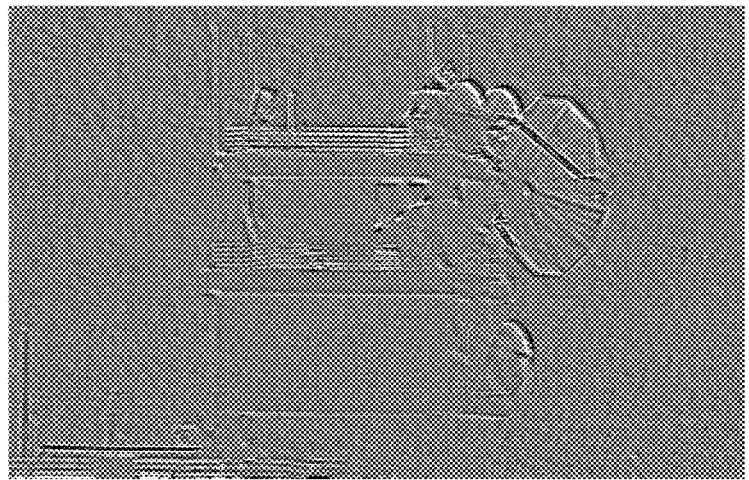
FIGS. 5A through 5C are example image frames illustrative of ghost FPN and edge contrast.
Figure 5B:

The alignment process aligns the scene content in the aligned frames, such that most of the scene content is canceled by the differencing of the aligned frames. Turbulence may prevent perfect cancellation of scene content in all frames. However, the shift in alignment also moves the FPN, such the difference images 327,329, include the FPN in the nominal position, plus a negated "ghost" versions of the FPN at an offset that is the difference in image positions. Since the alignment step swaps the order in the two difference frames, the offset of the ghost FPN is also swapped. FIGS. 5A and 5B illustrate additional examples of aligned difference images including ghost FPN. When difference images 327,329 are averaged to obtain the current error frame 328, real FPN 404A remains, but so do the two half intensity ghosts (402A, 402B indicate just single points of ghost FPN potentially present at numerous positions in current error frame 328). The negated or ghost version of the FPN moves position between subsequent image frames, so only 'real' FPN is stable from frame-to-frame, and will be consistently incremented in the recursive updating of the SBNUC correction terms.

In order to reduce ghost FPN, a consistency check is performed in transfer function processing block 340 by correlating the current error frame 328 and the current error 328P of the previous iteration (retrieved from buffer 312B) to determine a set of consistent pixel errors 342 containing real FPN 408. The correlation may assign the values of set of consistent pixel errors 342 to equal the smaller of the values of the current error frame 328 and the previous error frame 328P associated with the corrected preceding frame. Using the smaller error value is based on an assumption that if the error is due to FPN, the values should be approximately the same. If the respective polarities of the errors associated with the previous error frame 328P associated with the preceding iteration and the current error frame 328 changed, the consistency check may assign the values of the set of consistent pixel errors 342 to zero under an assumption that the error(s) is not due to FPN. Rather, the error is likely an artifact of the difference frames attributable to motion in the image, poor registration, or coincidental alignment of ghosts. Random noise may cause polarity changes and reduce the speed of convergence.

The aligned image difference process cancels scene content well, but may require precise calibration of the dither pattern offsets. The induced continuous dither pattern may include a pattern scale factor capable of being modulated in order to mitigate scene edge errors. A scale factor error between the dither pattern and correction causes some scene edges to generate an error. When the dither pattern scale factor is off, the image difference causes a consistent leakage of some scene content into the SBNUC correction terms around scene edges. If the dither scale factor is too low, the scene content has a negative polarity, while a high scale factor leads to a positive polarity. Pixel sizes may vary across the FPA, so a single dither scale factor may not perfectly cancel all scene content. By modulating the scale factor so the scene content alternates between positive and negative polarity, the scene edge errors are caused to change polarity between frames, and their effects are thus mitigated.

Figure 5C:
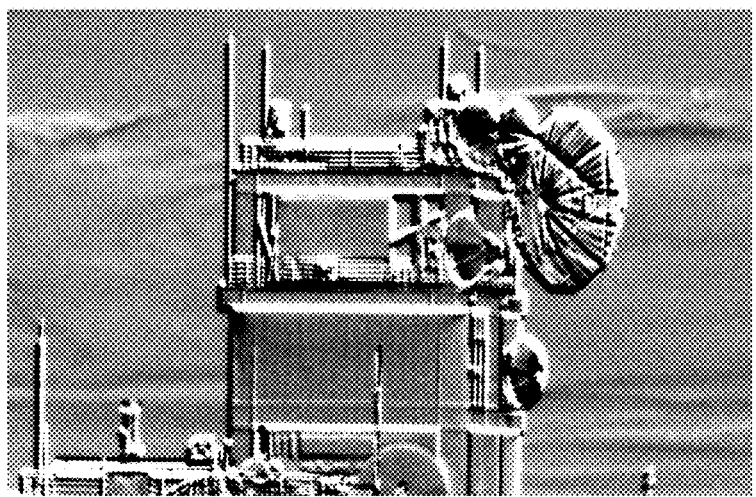

Method 300 adjusts (at 340) the consistent pixel errors set 342 in order to reduce transient effects (e.g., flashes of light, etc.) not truly representative of scene content. To this end, a contrast measure 332 is developed for identifying image frame areas that have contrast edges that may create false errors. High contrast areas represent portions of the image frames that are more likely to leak scene content into the SBNUC correction terms, so the clip limit is lowered in these areas. The contrast measure 332 is generated in raw difference processing step 330 from, as reflected in FIGS. 3 and 4C, by measuring contrast in a raw difference frame 331 formed from corrected current frame 314 and corrected preceding frame 324. Taking the raw difference between these frames cancels the FPN and preserves any high contrast edges in the images, advantageously allowing larger FPN clusters and blobs to have full corrections while reducing corrections near actual scene edges. In alternative embodiments, the contrast measure 332 is determined by measuring contrast edges in the current error 328, or in the corrected current frame 314. FIG. 5C provides another example of a raw difference image from which a contrast measure 332 can be determined. This image was generated from the same frame as the aligned difference images depicted in FIGS. 5A and 5B. Note that there appears to be no FPN in the raw difference image of FIG. 5C. Scaling is set to a fixed range in this image, causing some areas to be saturated. The image has edges that line up properly with both of the images in FIGS. 5A and 5B.

The transfer function (step 340) turns the current error 328 and preceding current error 328P into a set of consistent pixel errors 342 for updating the SBNUC coefficients. Generally, the transfer function comprises multiplying an error determined from the current error 328 and preceding current error 328P by a gain and clipping the result to a limit dependent on contrast measure 332, to obtain the set of consistent pixel errors 342. The contrast measure 332 adjustment to the clip limits is typically very low, so the alternating polarity of scene content will be clipped to a fixed amplitude, making it easier to cancel when the scale factor is not exact. The gain applied represents a correction gain that determines to what extent, per iteration, the consistent pixel errors set 342 calculated on a particular iteration will impact the updating of the SBNUC coefficients. Typically, only a fraction (e.g., $\frac{1}{16}$ or $\frac{1}{8}$, on scale of 0-1) of the calculated new correction values will be applied on any iteration, in order to reduce the effect of transient events not actually representative of scene content. The gain and clip limit values may be dynamically varied depending on how long the SBNUC process has been running, or how long the SBNUC process has been idle (e.g., the gain may be higher at system startup), and may be calculated or comprise a lookup table. This allows the process to correct a little more aggressively at the start, and less aggressively once the basic corrections are settled.

Large FPN offsets may cause very slow convergence of the largest errors, resulting in very long decay times. This can occur even in a completely bland actual scene, making it appear that the SBNUC process is not working effectively, and may even cause some large FPN errors to persist indefinitely. To allow for very large FPN that does not converge fast enough, if the FPN for a pixel is larger than a limit, then that pixel is declared bad and replaced, based on adjacent pixels. This removes the large FPN from the image.

In step 344, the adjusted (i.e., gain multiplied and clipped) consistent pixel errors set 342 is added to the previous SBNUC terms 308P to accumulate the error and obtain updated SBNUC correction terms 310. SBNUC terms associated with pixels that have previously been determined to be dead are not updated.

The updated SBNUC correction terms 310 may then, optionally, be processed through a decay function (step 346) to further minimize scene content, obtaining SBNUC correction terms 308 that are then stored in frame buffer 312C. (As described above, the SBNUC correction terms 308 are applied to incoming video frames, for each pixel data associated with each detector in the FPA.) The decay may apply a fixed offset to frames on every iteration to avoid adding temporal noise to the video stream 302. Prior art image processing techniques typically apply decay intermittently every N frames, causing an offset that recovered during the next N frames. That cycle often caused an increase in noise level. Application of decay on every iteration eliminates such noise and recovery cycling. Decay may be used as a way to reduce the incidence of scene content burn-in. The decay process simply adds or subtracts a value from each correction term, in order to drive the terms closer to zero. If a particular term was generated due to interpreting scene content as FPN, then the decay will assist in reducing or removing this term over time. The decay amount may be determined from the maximum error of the preceding two current error frames, which may be small once the SBNUC terms correct the FPN, but can be high if scene content is present in the measured errors. The use of a modulated dither scale factor reduces the rate of scene build up, so the decay amount can be kept very small.

Figure 6A:
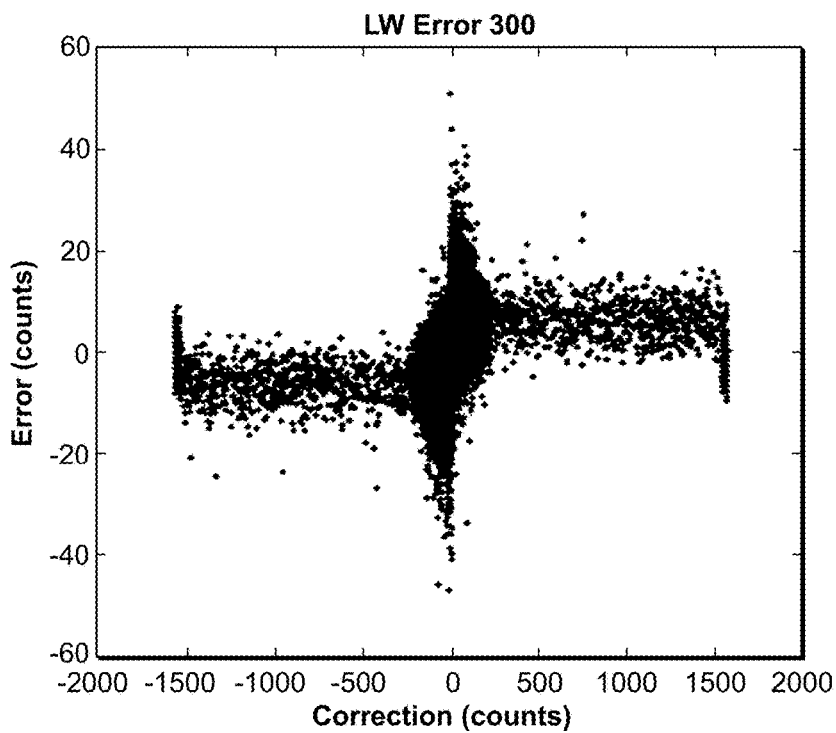
FIGS. 6A and 6B are sample plots of error offsets with and without decay compensation.
Figure 6B:
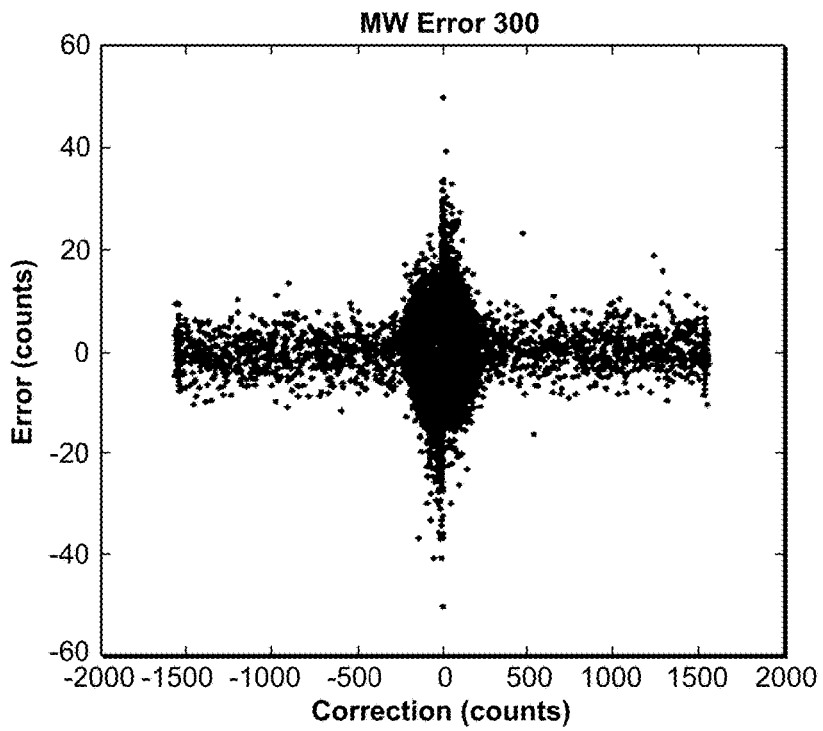

If a decay function has been employed, steps 348A and 348B for decay compensation for decay offset removal may be applied to mitigate the fact that the decay function may cause each correction term to be smaller than it should be. Decay compensation may be applied, respectively, to each corrected current frame 314 and to the set of SBNUC correction terms 308. The latter occurring after the terms are retrieved from frame buffer 312C to generate the preceding set of SBNUC terms 308P, which may then be updated (step 344) with the adjusted consistent pixel errors set 342. The decay compensation function mitigates the offset introduced into the SBNUC correction terms 308 by the decay process. FIGS. 6A and 6B illustrate, respectively, plots of error offset without decay compensation, and with compensation. In FIG. 6A, the average error of large negative corrections is approximately −5.91, and the standard deviation of the error for all large corrections is 7.04. In contrast, FIG. 6B shows that with decay compensation the average error of large negative corrections is approximately −0.07, with a standard deviation of the error for large corrections being approximately 3.83. The average offset is much smaller for large corrections when compensated.

Figure 7A:
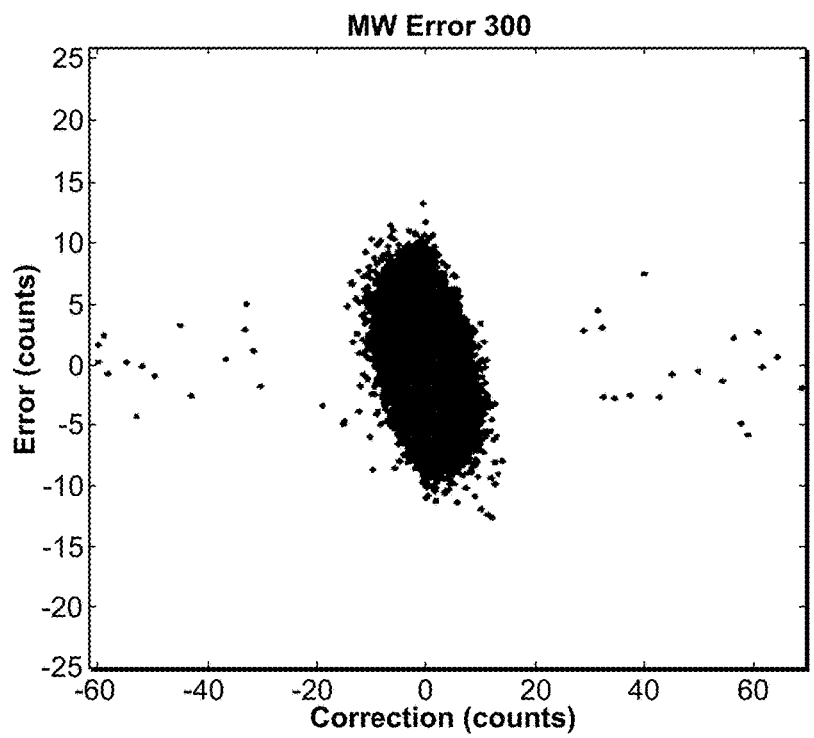
FIGS. 7A and 7B are sample plots of small correction compensation.
Figure 7B:
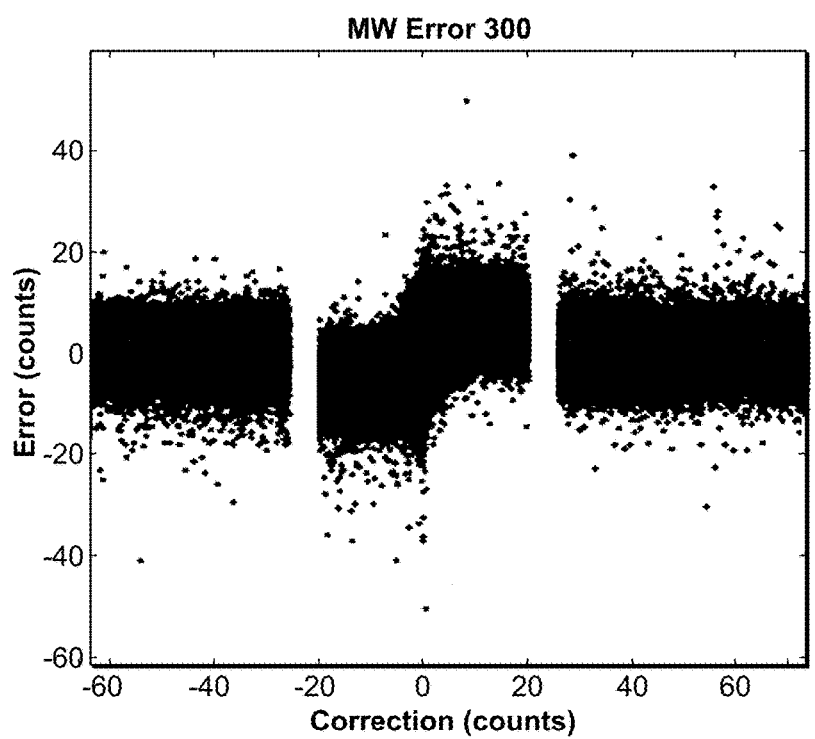

Small corrections may need different corrections depending the number of pixels with small corrections. If the FPN is small compared to the imaging system noise, then correcting the decay offset may actually increase the overall error, as shown in the plots of FIG. 7A (base FPN at 3.0 counts) and 7B (base FPN at 60.0 counts.) As the FPN increases, more pixels get corrections large enough to properly correct, and the required correction for the smaller pixels may change polarity. It is expected that the base FPN over all pixels (not counting the larger salt and pepper offsets) will be small, more similar to those in FIG. 7A. As a result, it may be prudent not to compensate pixels with small corrections.

In step 306, the current SBNUC terms 308 are added to the instant frame of the input video stream 302, and in step 307 the continuous motion component (e.g., induced dither pattern) is removed from the corrected input frames to generate the output video stream 304. This latter step involves aligning the rows, columns and/or rotation of the imaged pixels of each frame back to their respective nominal (unshifted) positions, removing the dither shift, in order to produce a stable output video. Rotation may be present because the dithering optics (e.g., IMC mirror) may induce some rotation when moving in one of the two axes (x, y) of motion. The alignment step (307) may involve rotating and offsetting the image using fractional pixel movements at each pixel.

The systems and methods disclosed above may be applied to numerous types of video imaging systems, but are particularly useful with thermal wave IR, short wave IR, and near IR bands used in large staring arrays. Applications include ground sensors, airborne sensors and missile systems, and/or any uncooled or cooled sensors having a need for FPN reduction in surveillance, security and scientific applications. Details well known to those skilled in the art have not been set out, so as not to obscure the embodiments. It will be apparent to those skilled in the art in the view of this disclosure that modifications, substitutions and/or changes may be made without departing from the scope and spirit of the invention. While the known continuous motion component has been described in detail as the result of an induced dither pattern, the signal processing techniques described above could be used in implementations where the known continuous motion is comprised of measured normal LOS data (e.g., a known motion of a sensor platform, etc.) substituted for dither control.

Figure 8A:
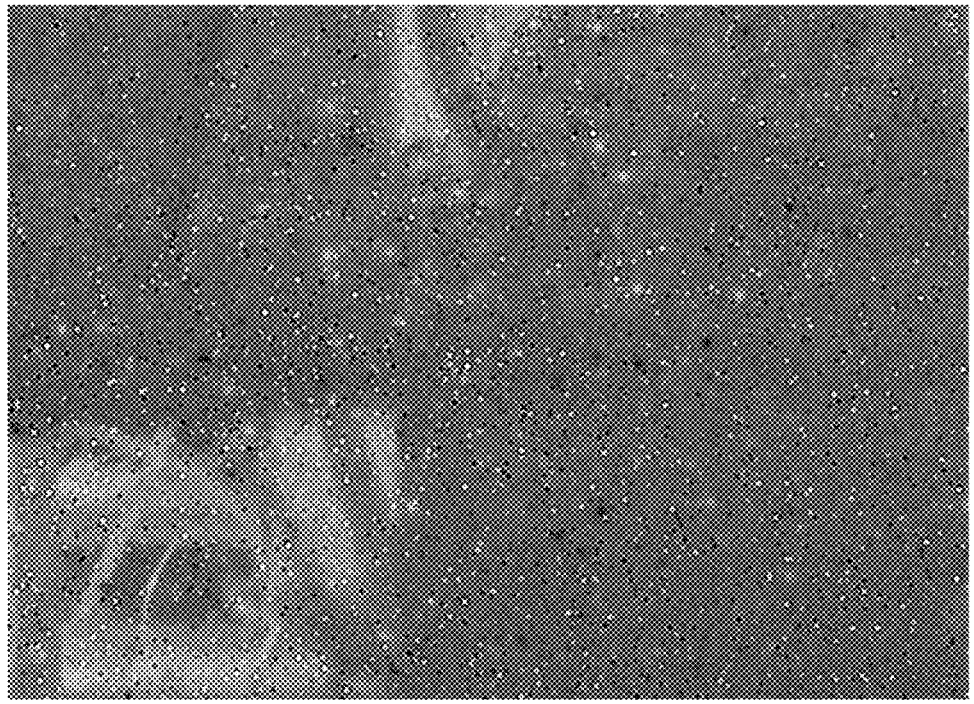
FIGS. 8A and 8B are sample video image frames without and with continuous known dither SBNUC correction.
Figure 8B:

Continuous known motion SBNUC image processing has been implemented in a demonstration system and demonstrated improved capabilities, including operation for many hours between full system calibrations, and the ability to handle complex scenes with moving objects. FIG. 8A shows a frame of a raw video feed of a laboratory scene prior to application of the process, and FIG. 8B shows the frame after application of the process (using a known dither pattern.) Benefits and advantages over prior art FPN reduction processes include that the techniques disclosed herein do not block operation of the video stream during processing, and function during stationary LOS and target tracking operations, eliminating the need for a human operator to monitor the image quality and to take corrective actions.

As used above, the terms "comprise," "include," and/or plural forms of each are open ended and include the listed parts and can include additional parts that are not listed. "And/or" is open ended and includes one or more of the listed parts and combinations of the listed parts. "Terms" and "coefficients" have been used interchangeably in the description above.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method of reducing an amount of fixed pattern noise from infrared images, the method comprising:
   receiving, by one or more processors, a plurality of sequential frames captured by an imaging sensor and containing a known continuous motion component, each frame referred to as a current frame and having a respective preceding frame;
   for each current frame in the plurality of sequential frames, applying, by the one or more processors, a set of pixel correction terms to generate a corrected current frame;
   recursively updating, by the one or more processors, the set of pixel correction terms by:
      aligning the corrected current frame with a corrected preceding frame, wherein the corrected preceding frame and the corrected current frame are sequential frames that have different scene lines of sight due to the known continuous motion component;
      calculating a current error frame from a difference between the aligned corrected current frame and the corrected preceding frame;
      correlating the current error frame with a preceding error frame from the preceding iteration to determine a set of consistent pixel errors;
      generating a contrast measure identifying image areas of potentially image corrupting contrast;
      adjusting the set of consistent pixel errors to be applied to the set of pixel correction terms based on the generated contrast measure to obtain an adjusted consistent error;
      generating an updated set of current pixel correction terms by adding the adjusted set of consistent pixel errors to a preceding set of correction terms and by applying a continuous decay function to a sum of the set of adjusted consistent pixel errors and a preceding set of correction terms to avoid inducing time domain noise; and
      removing, by the one or more processors, the known continuous motion component from the corrected current frame.

2. The computer-implemented method of claim 1, wherein the known continuous motion component comprises an optically induced continuous dither pattern in a line of sight of the imaging sensor.

3. The computer-implemented method of claim 2, wherein the optically induced continuous dither pattern includes a pattern scale factor capable of being modulated in order to mitigate scene edge errors by alternating between successive frames the polarity of the scene edge errors.

4. The computer-implemented method of claim 2, wherein:
   the dither pattern is optically induced with image motion compensation optics; and
   aligning the corrected current frame with a corrected preceding frame includes aligning in at least one of rows, columns and rotation of pixels in a Focal Plane Array of the imaging sensor.

5. The computer-implemented method of claim 1, wherein the known continuous motion component comprises measured line of sight motion data.

6. The computer-implemented method of claim 1, wherein aligning the corrected current frame with a corrected preceding frame comprises:
   resampling the corrected preceding frame in alignment with the corrected current frame based on the known continuous motion component; and
   registering the corrected current frame and the corrected preceding frame.

7. The computer-implemented method of claim 1, wherein generating the updated set of current pixel correction terms further comprises applying a decay compensation process to the sum of the set of adjusted consistent pixel errors and the preceding set of correction terms to mitigate the offset introduced by the decay function.

8. The computer-implemented method of claim 1, wherein a size of the decay applied is determined based on a maximum value of the set of consistent pixel errors over the preceding two frames.

9. The computer-implemented method of claim 1, wherein correlating the current error frame with the preceding error frame of the preceding iteration further comprises:
   setting the set of consistent pixel errors to equal a smaller of the values of the current error frame and the preceding error frame associated with the corrected preceding frame; and
   if respective polarities of the current errors associated with the corrected preceding frame and the set of consistent pixel errors of the present frame are different, setting the set of consistent pixel errors to zero.

10. The computer-implemented method of claim 1, wherein generating a contrast measure comprises a technique selected from: measuring contrast edges in a raw difference image formed from the corrected current frame and the corrected preceding frame, in at least one of the aligned difference images, or in the current frame.

11. The computer-implemented method of claim 1, wherein the imaging sensor comprises one of a thermal wave IR, a short wave IR, and a near IR sensor.

12. The computer-implemented method of claim 1, wherein calculating the current error frame comprises a technique selected from:
   1) averaging two difference frames obtained by subtracting the aligned one of the corrected current frame and the corrected preceding frame from the other frame, or
   2) subtracting the aligned corrected previous frame from the corrected current frame, and setting, on alternating iterations, the current error frame to the difference frame resulting from subtracting (a) the aligned corrected current frame from the corrected previous frame, and (b) the aligned corrected previous frame from the corrected current frame.

13. The computer-implemented method of claim 1, wherein adjusting the set of consistent pixel errors comprises applying a gain to the set of consistent pixel errors limited by the contrast measure.

14. An apparatus for reducing an amount of fixed pattern noise from infrared images, the apparatus comprising:
an array of image-responsive detectors, each of said detectors producing an image signal responsive to the portion of an observed scene content incident on said detector, thereby creating a plurality of sequential frames of video data, each frame referred to as a current frame and having a respective preceding frame;
an optical element for introducing into each of the sequential frames a known continuous motion component;
one or more processors coupled to the array configured to:
for each current frame in the plurality of sequential frames, apply a set of pixel correction terms to generate a corrected current frame; and
recursively update the set of pixel correction terms by:
aligning the corrected current frame with a corrected preceding frame, wherein the corrected preceding frame and the corrected current frame are sequential frames that have different scene lines of sight due to the known continuous motion component;
calculating a current error frame from a difference between the aligned corrected current frame and the corrected preceding frame;
correlating the current error frame with a preceding error frame from the preceding iteration to determine a set of consistent pixel errors;
generating a contrast measure identifying image areas of potentially image corrupting contrast;
adjusting the set of consistent pixel errors to be applied to the set of pixel correction terms based on the generated contrast measure to obtain an adjusted consistent error;
generating an updated set of current pixel correction terms by adding the adjusted set of consistent pixel errors to a preceding set of correction terms and by applying a continuous decay function to a sum of the set of adjusted consistent pixel errors and a preceding set of correction terms to avoid inducing time domain noise; and
removing the known continuous motion component from the corrected current frame.

15. The apparatus of claim 14, wherein the known continuous motion component comprises an optically induced continuous dither pattern including a pattern scale factor capable of being modulated in order to mitigate scene edge errors by alternating between successive frames the polarity of the scene edge errors.

16. The apparatus of claim 14, wherein the one or processors are further configured to align the corrected current frame with a corrected preceding frame by:
resampling the corrected preceding frame in alignment with the corrected current frame based on the known continuous motion component; and
registering the corrected current frame and the corrected preceding frame.

17. The apparatus of claim 14, wherein the one or more processors are further configured to generate the contrast measure by measuring contrast edges in a raw difference image between the corrected current frame and corrected preceding frame.

18. A non-transitory computer-readable medium storing image processing executable instructions for a method reducing an amount of fixed pattern noise from infrared images that when executed by one or more image processing processors, cause the one or more processors to:
receive a plurality of sequential frames captured by an imaging sensor and containing a known continuous motion component, each frame referred to as a current frame and having a respective preceding frame;
for each current frame in the plurality of sequential frames, apply a set of pixel correction terms to generate a corrected current frame;
recursively update the set of pixel correction terms by:
aligning the corrected current frame with a corrected preceding frame, wherein the corrected preceding frame and the corrected current frame are sequential frames that have different scene lines of sight due to the known continuous motion component;
calculating a current error frame from a difference between the aligned corrected current frame and the corrected preceding frame;
correlating the current error frame with a preceding error frame from the preceding iteration to determine a set of consistent pixel errors;
generating a contrast measure identifying image areas of potentially image corrupting contrast;
adjusting the set of consistent pixel errors to be applied to the set of pixel correction terms based on the generated contrast measure to obtain an adjusted consistent error;
generating an updated set of current pixel correction terms by adding the adjusted set of consistent pixel errors to the preceding set of correction terms and by applying a continuous decay function to a sum of the set of adjusted consistent pixel errors and a preceding set of correction terms to avoid inducing time domain noise; and
remove the known continuous motion component from the corrected current frame.

19. The apparatus of claim 14, wherein correlating the current error frame with the preceding error frame of the preceding iteration further comprises:
setting the set of consistent pixel errors to equal a smaller of the values of the current error frame and the preceding error frame associated with the corrected preceding frame; and
if respective polarities of the current errors associated with the corrected preceding frame and the set of consistent pixel errors of the present frame are different, setting the set of consistent pixel errors to zero.

20. The apparatus of claim 14, wherein calculating the current error frame comprises a technique selected from:
1) averaging two difference frames obtained by subtracting the aligned one of the corrected current frame and the corrected preceding frame from the other frame, or
2) subtracting the aligned corrected previous frame from the corrected current frame, and setting, on alternating iterations, the current error frame to the difference frame resulting from subtracting (a) the aligned corrected current frame from the corrected previous frame, and (b) the aligned corrected previous frame from the corrected current frame.

21. The non-transitory computer-readable medium of claim 18, wherein calculating the current error frame comprises a technique selected from:

1) averaging two difference frames obtained by subtracting the aligned one of the corrected current frame and the corrected preceding frame from the other frame, or
2) subtracting the aligned corrected previous frame from the corrected current frame, and setting, on alternating iterations, the current error frame to the difference frame resulting from subtracting (a) the aligned corrected current frame from the corrected previous frame, and (b) the aligned corrected previous frame from the corrected current frame.

22. The non-transitory computer-readable medium of claim 18, wherein correlating the current error frame with the preceding error frame of the preceding iteration further comprises:
   setting the set of consistent pixel errors to equal a smaller of the values of the current error frame and the preceding error frame associated with the corrected preceding frame; and
   if respective polarities of the current errors associated with the corrected preceding frame and the set of consistent pixel errors of the present frame are different, setting the set of consistent pixel errors to zero.

23. A non-transitory computer-readable medium storing image processing executable instructions that when executed by one or more image processing processors, cause the one or more processors to:
   receive a plurality of sequential frames captured by an imaging sensor and containing a known continuous motion component, each frame referred to as a current frame and having a respective preceding frame;
   for each current frame in the plurality of sequential frames, apply a set of pixel correction terms to generate a corrected current frame;
   recursively update the set of pixel correction terms by:
      aligning the corrected current frame with a corrected preceding frame, wherein the corrected preceding frame and the corrected current frame are sequential frames that have different scene lines of sight due to the known continuous motion component;
      calculating a current error frame from a difference between the aligned corrected current frame and the corrected preceding frame;
      correlating the current error frame with a preceding error frame from the preceding iteration to determine a set of consistent pixel errors;
      generating a contrast measure identifying image areas of potentially image corrupting contrast;
      adjusting the set of consistent pixel errors to be applied to the set of pixel correction terms based on the generated contrast measure to obtain an adjusted consistent error;
      generating an updated set of current pixel correction terms by adding the adjusted set of consistent pixel errors to the preceding set of correction; and
   remove the known continuous motion component from the corrected current frame,
   wherein correlating the current error frame with the preceding error frame of the preceding iteration further comprises:
      setting the set of consistent pixel errors to equal a smaller of the values of the current error frame and the preceding error frame associated with the corrected preceding frame; and
      if respective polarities of the current errors associated with the corrected preceding frame and the set of consistent pixel errors of the present frame are different, setting the set of consistent pixel errors to zero.

24. The non-transitory computer-readable medium of claim 23, wherein calculating the current error frame comprises a technique selected from:
   1) averaging two difference frames obtained by subtracting the aligned one of the corrected current frame and the corrected preceding frame from the other frame, or
   2) subtracting the aligned corrected previous frame from the corrected current frame, and setting, on alternating iterations, the current error frame to the difference frame resulting from subtracting (a) the aligned corrected current frame from the corrected previous frame, and (b) the aligned corrected previous frame from the corrected current frame.

25. A non-transitory computer-readable medium storing image processing executable instructions that when executed by one or more image processing processors, cause the one or more processors to:
   receive a plurality of sequential frames captured by an imaging sensor and containing a known continuous motion component, each frame referred to as a current frame and having a respective preceding frame;
   for each current frame in the plurality of sequential frames, apply a set of pixel correction terms to generate a corrected current frame;
   recursively update the set of pixel correction terms by:
      aligning the corrected current frame with a corrected preceding frame, wherein the corrected preceding frame and the corrected current frame are sequential frames that have different scene lines of sight due to the known continuous motion component;
      calculating a current error frame from a difference between the aligned corrected current frame and the corrected preceding frame;
      correlating the current error frame with a preceding error frame from the preceding iteration to determine a set of consistent pixel errors;
      generating a contrast measure identifying image areas of potentially image corrupting contrast;
      adjusting the set of consistent pixel errors to be applied to the set of pixel correction terms based on the generated contrast measure to obtain an adjusted consistent error;
      generating an updated set of current pixel correction terms by adding the adjusted set of consistent pixel errors to the preceding set of correction; and
   remove the known continuous motion component from the corrected current frame,
   wherein calculating the current error frame comprises a technique selected from:
      1) averaging two difference frames obtained by subtracting the aligned one of the corrected current frame and the corrected preceding frame from the other frame, or
      2) subtracting the aligned corrected previous frame from the corrected current frame, and setting, on alternating iterations, the current error frame to the difference frame resulting from subtracting (a) the aligned corrected current frame from the corrected previous frame, and (b) the aligned corrected previous frame from the corrected current frame.

26. A computer-implemented method of reducing an amount of fixed pattern noise from infrared images, the method comprising:

receiving, by one or more processors, a plurality of sequential frames captured by an imaging sensor and containing a known continuous motion component, each frame referred to as a current frame and having a respective preceding frame;

for each current frame in the plurality of sequential frames, applying, by the one or more processors, a set of pixel correction terms to generate a corrected current frame;

recursively updating, by the one or more processors, the set of pixel correction terms by:
   aligning the corrected current frame with a corrected preceding frame, wherein the corrected preceding frame and the corrected current frame are sequential frames that have different scene lines of sight due to the known continuous motion component;
   calculating a current error frame from a difference between the aligned corrected current frame and the corrected preceding frame;
   correlating the current error frame with a preceding error frame from the preceding iteration to determine a set of consistent pixel errors;
   generating a contrast measure identifying image areas of potentially image corrupting contrast;
   adjusting the set of consistent pixel errors to be applied to the set of pixel correction terms based on the generated contrast measure to obtain an adjusted consistent error;
   generating an updated set of current pixel correction terms by adding the adjusted set of consistent pixel errors to a preceding set of correction terms; and
   removing, by the one or more processors, the known continuous motion component from the corrected current frame,
   wherein correlating the current error frame with the preceding error frame of the preceding iteration further comprises:
      setting the set of consistent pixel errors to equal a smaller of the values of the current error frame and the preceding error frame associated with the corrected preceding frame; and
      if respective polarities of the current errors associated with the corrected preceding frame and the set of consistent pixel errors of the present frame are different, setting the set of consistent pixel errors to zero.

27. The computer-implemented method of claim 26, wherein calculating the current error frame comprises a technique selected from:
1) averaging two difference frames obtained by subtracting the aligned one of the corrected current frame and the corrected preceding frame from the other frame, or
2) subtracting the aligned corrected previous frame from the corrected current frame, and setting, on alternating iterations, the current error frame to the difference frame resulting from subtracting (a) the aligned corrected current frame from the corrected previous frame, and (b) the aligned corrected previous frame from the corrected current frame.

28. A computer-implemented method of reducing an amount of fixed pattern noise from infrared images, the method comprising:
   receiving, by one or more processors, a plurality of sequential frames captured by an imaging sensor and containing a known continuous motion component, each frame referred to as a current frame and having a respective preceding frame;
   for each current frame in the plurality of sequential frames, applying, by the one or more processors, a set of pixel correction terms to generate a corrected current frame;
   recursively updating, by the one or more processors, the set of pixel correction terms by:
      aligning the corrected current frame with a corrected preceding frame, wherein the corrected preceding frame and the corrected current frame are sequential frames that have different scene lines of sight due to the known continuous motion component;
      calculating a current error frame from a difference between the aligned corrected current frame and the corrected preceding frame;
      correlating the current error frame with a preceding error frame from the preceding iteration to determine a set of consistent pixel errors;
      generating a contrast measure identifying image areas of potentially image corrupting contrast;
      adjusting the set of consistent pixel errors to be applied to the set of pixel correction terms based on the generated contrast measure to obtain an adjusted consistent error;
      generating an updated set of current pixel correction terms by adding the adjusted set of consistent pixel errors to a preceding set of correction terms; and
      removing, by the one or more processors, the known continuous motion component from the corrected current frame,
   wherein calculating the current error frame comprises a technique selected from:
      1) averaging two difference frames obtained by subtracting the aligned one of the corrected current frame and the corrected preceding frame from the other frame, or
      2) subtracting the aligned corrected previous frame from the corrected current frame, and setting, on alternating iterations, the current error frame to the difference frame resulting from subtracting (a) the aligned corrected current frame from the corrected previous frame, and (b) the aligned corrected previous frame from the corrected current frame.

29. An apparatus for reducing an amount of fixed pattern noise from infrared images, the apparatus comprising:
   an array of image-responsive detectors, each of said detectors producing an image signal responsive to the portion of an observed scene content incident on said detector, thereby creating a plurality of sequential frames of video data, each frame referred to as a current frame and having a respective preceding frame;
   an optical element for introducing into each of the sequential frames a known continuous motion component;
   one or more processors coupled to the array configured to:
      for each current frame in the plurality of sequential frames, apply a set of pixel correction terms to generate a corrected current frame; and
      recursively update the set of pixel correction terms by:
         aligning the corrected current frame with a corrected preceding frame, wherein the corrected preceding frame and the corrected current frame are sequential frames that have different scene lines of sight due to the known continuous motion component;
         calculating a current error frame from a difference between the aligned corrected current frame and the corrected preceding frame;

correlating the current error frame with a preceding error frame from the preceding iteration to determine a set of consistent pixel errors;

generating a contrast measure identifying image areas of potentially image corrupting contrast;

adjusting the set of consistent pixel errors to be applied to the set of pixel correction terms based on the generated contrast measure to obtain an adjusted consistent error;

generating an updated set of current pixel correction terms by adding the adjusted set of consistent pixel errors to a preceding set of correction terms; and removing the known continuous motion component from the corrected current frame, wherein calculating the current error frame comprises a technique selected from:
1) averaging two difference frames obtained by subtracting the aligned one of the corrected current frame and the corrected preceding frame from the other frame, or
2) subtracting the aligned corrected previous frame from the corrected current frame, and setting, on alternating iterations, the current error frame to the difference frame resulting from subtracting (a) the aligned corrected current frame from the corrected previous frame, and (b) the aligned corrected previous frame from the corrected current frame.

30. The apparatus of claim 29, wherein correlating the current error frame with the preceding error frame of the preceding iteration further comprises:

setting the set of consistent pixel errors to equal a smaller of the values of the current error frame and the preceding error frame associated with the corrected preceding frame; and if respective polarities of the current errors associated with the corrected preceding frame and the set of consistent pixel errors of the present frame are different, setting the set of consistent pixel errors to zero.

31. An apparatus for reducing an amount of fixed pattern noise from infrared images, the apparatus comprising:

an array of image-responsive detectors, each of said detectors producing an image signal responsive to the portion of an observed scene content incident on said detector, thereby creating a plurality of sequential frames of video data, each frame referred to as a current frame and having a respective preceding frame;

an optical element for introducing into each of the sequential frames a known continuous motion component;

one or more processors coupled to the array configured to:
for each current frame in the plurality of sequential frames, apply a set of pixel correction terms to generate a corrected current frame; and recursively update the set of pixel correction terms by:
aligning the corrected current frame with a corrected preceding frame, wherein the corrected preceding frame and the corrected current frame are sequential frames that have different scene lines of sight due to the known continuous motion component;

calculating a current error frame from a difference between the aligned corrected current frame and the corrected preceding frame;

correlating the current error frame with a preceding error frame from the preceding iteration to determine a set of consistent pixel errors;

generating a contrast measure identifying image areas of potentially image corrupting contrast;

adjusting the set of consistent pixel errors to be applied to the set of pixel correction terms based on the generated contrast measure to obtain an adjusted consistent error;

generating an updated set of current pixel correction terms by adding the adjusted set of consistent pixel errors to a preceding set of correction terms; and removing the known continuous motion component from the corrected current frame, wherein correlating the current error frame with the preceding error frame of the preceding iteration further comprises:
setting the set of consistent pixel errors to equal a smaller of the values of the current error frame and the preceding error frame associated with the corrected preceding frame; and if respective polarities of the current errors associated with the corrected preceding frame and the set of consistent pixel errors of the present frame are different, setting the set of consistent pixel errors to zero.

* * * * *